United States Patent
Abouelenin

(10) Patent No.: US 12,008,570 B2
(45) Date of Patent: *Jun. 11, 2024

(54) SYSTEMS AND METHODS FOR INTELLIGENT STEP-UP FOR ACCESS CONTROL SYSTEMS

(71) Applicant: MASTERCARD INTERNATIONAL INCORPORATED, Purchase, NY (US)

(72) Inventor: Mohamed Abouelenin, San Francisco, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/977,323

(22) Filed: Oct. 31, 2022

(65) Prior Publication Data

US 2023/0052965 A1     Feb. 16, 2023

Related U.S. Application Data

(63) Continuation of application No. 16/666,903, filed on Oct. 29, 2019, now Pat. No. 11,494,768.

(60) Provisional application No. 62/752,144, filed on Oct. 29, 2018.

(51) Int. Cl.
    *G06Q 20/12* (2012.01)
    *G06Q 20/40* (2012.01)
    *H04L 9/40* (2022.01)

(52) U.S. Cl.
    CPC ......... *G06Q 20/4014* (2013.01); *G06Q 20/12* (2013.01); *H04L 63/0876* (2013.01)

(58) Field of Classification Search
    None
    See application file for complete search history.

(56) References Cited

U.S. PATENT DOCUMENTS

| | | | |
|---|---|---|---|
| 9,065,824 | B1 | 6/2015 | Valdivia |
| 11,127,011 | B2 | 9/2021 | Jin |
| 2014/0189779 | A1 | 7/2014 | Baghdasaryan et al. |
| 2016/0371686 | A1 | 12/2016 | Metral |
| 2017/0193500 | A1 | 7/2017 | Hugot |
| 2017/0372310 | A1* | 12/2017 | Narasimhan ........ H04L 63/0853 |

(Continued)

FOREIGN PATENT DOCUMENTS

JP    201325553 A    2/2013

OTHER PUBLICATIONS

International Search Report and Written Opinion dated Feb. 18, 2020 which was issued in connection with PCT Application No. PCT/US19/058507 which was filed Oct. 29, 2019.

(Continued)

*Primary Examiner* — Narayanswamy Subramanian
(74) *Attorney, Agent, or Firm* — Buckley, Maschoff & Talwalkar LLC

(57) ABSTRACT

Some embodiments may provide systems, methods and computer program code to method to facilitate an interaction involving a user which include determining that a user authentication is required to complete the interaction, identifying at least a first verified device associated with the user, and transmitting an authentication message to the at least first verified device.

15 Claims, 12 Drawing Sheets

(56) References Cited

U.S. PATENT DOCUMENTS

2023/0376952 A1* 11/2023 Devdas ................ G06Q 50/06

OTHER PUBLICATIONS

Carver, Brett K., Gmail Account Recovery, [online], Jul. 2017 [retrieved on Feb. 4, 2020], Retrieved from the Internet: <URL:http://gmailaccountrecovery.blogspot.com/> pp. 2-5,11-14 especially [Accounts With 2-Step Verification Enabled].

Form 892 dated Oct. 15, 2021 which was issued in connection with U.S. Appl. No. 16/666,903.

Form 892 dated Jun. 30, 2022 which was issued in connection with U.S. Appl. No. 16/666,903.

Notice of Allowance which was issued in connection with U.S. Appl. No. 16/666,903.

* cited by examiner

SYSTEMS AND METHODS FOR INTELLIGENT STEP-UP FOR ACCESS CONTROL SYSTEMS

RELATED APPLICATIONS

This application is a continuation of and based on and claims benefit of U.S. Non-Provisional patent application Ser. No. 16/666,903 which was filed on Oct. 29, 2019 and on U.S. Provisional Patent Application Ser. No. 62/752,144 filed on Oct. 29, 2018, the contents of which are hereby incorporated in their entirety for all purposes.

BACKGROUND

Consumers increasingly are interacting remotely with merchants and other service providers. For example, remote payment transactions are very common. It is increasingly important that merchants and other participants in such remote transactions be able to accurately authenticate aspects of such remote transactions (for example, in a remote payment transaction, it is important to be able to authenticate that the consumer is the cardholder of the payment device to be used in the transaction). As more and more devices become "smart" devices capable of storing information and interacting with other devices and systems over communication networks such as the Internet, there is increasing demand for those devices to be capable of participating in interactions including payment transactions. However, it is difficult to authenticate or authorize these devices to validate that they are associated with a user.

It would be desirable to provide improved systems and methods to perform authentication in remote transactions.

SUMMARY OF THE INVENTION

According to some embodiments, systems, methods and computer program code are provided to facilitate an interaction involving a user which include determining that a user authentication is required to complete the interaction, identifying at least a first verified device associated with the user, and transmitting an authentication message to the at least first verified device. Pursuant to some embodiments, at least a second verified device associated with the user is identified, and information associated with the at least first and second verified devices is presented to the user. A selection from the user is received to identify which device is to be used to complete the interaction.

Pursuant to some embodiments, the interaction is a payment transaction involving the user and a merchant. In some embodiments, the process further includes receiving a payment authorization request from the merchant, the payment authorization request including information usable to identify a payment account associated with the user, and the identifying at least a first and a second verified device associated with the user includes identifying at least a first and a second verified device associated with the payment account associated with the user.

In some embodiments, the interaction is one to perform expedited verification of a user device and processing includes receiving a request from the user to register the user device as an at least second verified device associated with the user. In some embodiments, the interaction is a transaction involving the user and a service provider (such as, for example, a financial institution).

A technical effect of some embodiments of the invention is an improved and secure way to register devices to become authentication devices as well as to involve those authentication devices in transactions. With these and other advantages and features that will become hereinafter apparent, a more complete understanding of the nature of the invention can be obtained by referring to the following detailed description and to the drawings appended hereto.

DETAILED DESCRIPTION

Figure 1:
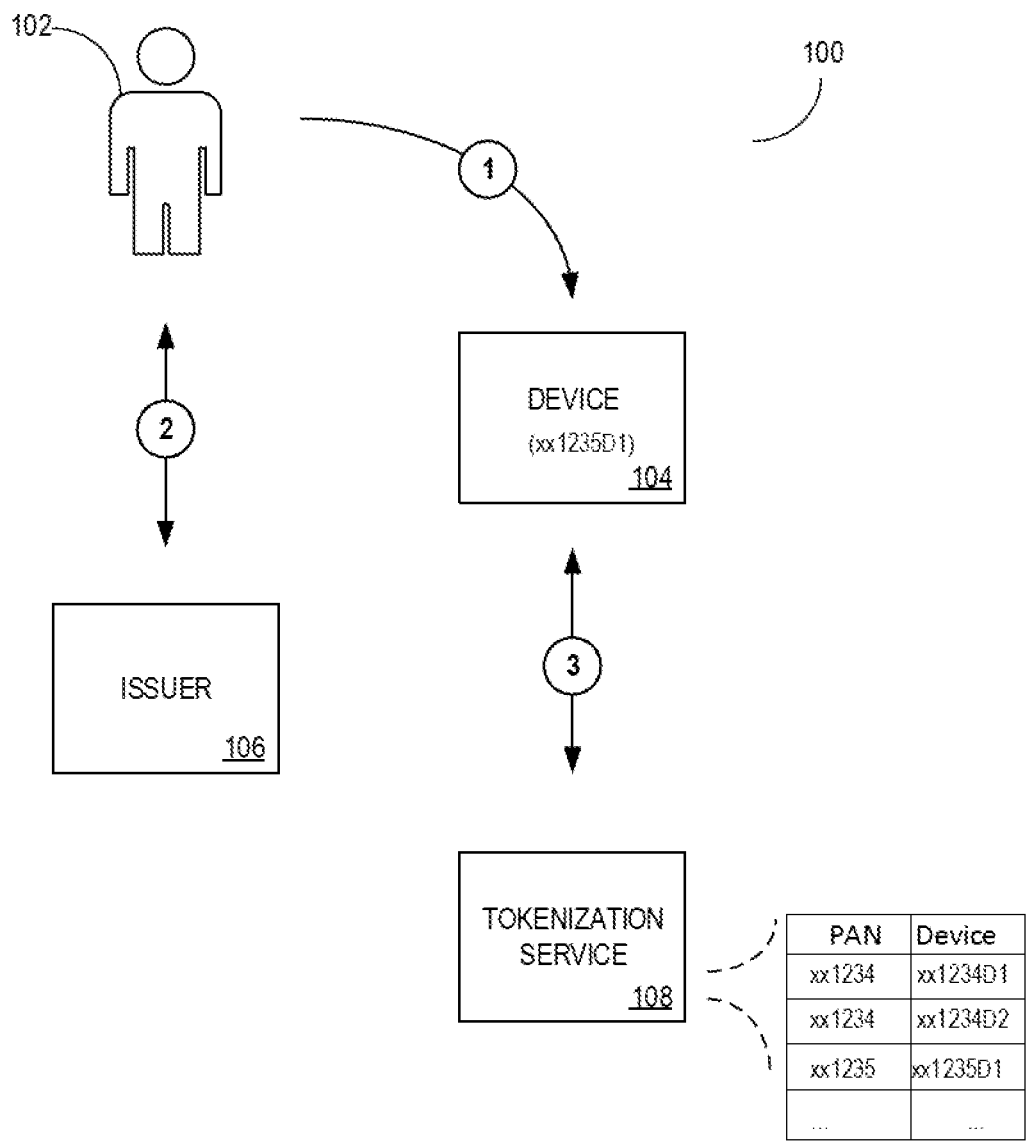
FIG. 1 is a block diagram of a system pursuant to some embodiments.

In general, and for the purpose of introducing concepts of embodiments of the present disclosure, embodiments provide systems, methods and computer program code to method to facilitate an interaction involving a user which include determining that a user authentication is required to complete the interaction, identifying at least a first verified device associated with the user, and transmitting an authentication message to the at least first verified device. Pursuant to some embodiments, at least a second verified device associated with the user is identified, and information associated with the at least first and second verified devices is presented to the user. A selection from the user is received to identify which device is to be used to complete the interaction. Embodiments may be used in a number of different interaction environments. For example, embodiments may be used in financial transactions to provide an additional "step-up" level of user authentication. In many card-not-present or remote transactions, it is difficult to authenticate the user. Technologies such as MasterCard International Incorporated's SecureCode provide an enhanced layer of authentication in certain remote transactions. Embodiments may be used in conjunction with such technologies to provide additional authentication as will be described further herein. In some embodiments, the present invention may be used to provide user authentication in other types of transactions as well.

In some embodiments, features of the present invention may be used in interactions to identify and verify new devices to be associated with a user. Further, features may be used in interactions to cause such new devices to be payment enabled. As more and more devices become accessible or connected with other devices (e.g., via the Internet) there is increasing demand for these devices to become payment enabled. Such devices may generally be referred to as "smart devices" and examples include smart appliances, automobiles, physical shopping carts, watches, exercise monitors, or the like. In general, as used herein, the term "smart device" or "device" refers to devices that are in communication with a payment network (e.g., via the Internet or the like) and that have a storage device capable of storing payment account information such as, for example, tokenized payment credentials. As used herein the term "token" or "tokenized payment credentials" or "token PAN" refers to a primary account number ("PAN") tokenized using a tokenization system, such as the Mastercard Digital Enablement Service ("MDES") offered by the assignee of the present application, a virtual card number ("VCN") or a controlled payment number ("CPN").

As used herein, devices which have been provisioned with an identified and verified "token" so that the device may be used as an authentication device may be referred to herein as "authentication devices" or "authentication wallets". In some embodiments, existing devices may already be payment enabled and may function as authentication wallets. For example, a mobile phone may be equipped with a wallet (such as an Android Wallet) which has previously been authenticated and which has one or more tokens associated with it. Such devices may operate as authentication wallets in the system of the present invention. In particular, such devices may operate as authentication wallets because they have been properly authenticated and equipped with tokens and other cryptographic protections that can be relied on in transactions pursuant to the present invention. Other devices, as will be described further herein, may be made "authentication devices" using a registration approach described herein.

The present invention provides significant technical improvements to facilitate authentication in different interactions. The present invention is directed to more than a mere computer implementation of a routine or conventional activity previously known in the industry as it significantly advances the technical efficiency, access and/or accuracy of communications between devices by implementing a specific new method and system as defined herein. The present invention is a specific advancement in the area of electronic transactions by providing benefits in security, user experience, and reduced integration complexity and such advances are not merely a longstanding commercial practice.

FIG. 1 is a high-level block diagram of a system 100 according to some embodiments of the present invention. In particular, system 100 of FIG. 1 depicts devices participating in a transaction to register a device 104 associated with a user 102 so that the device 104 may be used as an authentication device in transactions pursuant to the present invention. In general, the device 104 may be any device capable of storing information and communicating with other devices or systems. The device 104 ideally has some form of display to display information as well as some form of input device to receive an input from a user 102 as described further herein. For example, the device 104 may be a smart watch (such as an Apple Watch® provided by Apple, Inc.), an exercise monitor (such as a Fitbit® device) or the like. A user 102 may engage in a registration transaction pursuant to the present invention in order to enable the device 104 to be used to authenticate transactions pursuant to the present invention as well as to enable the device to be used in payment transactions.

The registration process begins at "1" where the user 102 interacts with the device 104 (either directly by interacting with an input and display of the device, or indirectly by pairing the device 104 with another device with an input and output device such as a mobile telephone, a personal computer or the like) to initiate a provisioning process. For example, the user may interact with a web page provided by an issuer 106 of a payment card issued to the user 102 to associate the payment card information with the device 104 (shown as the interaction at "2"). The interaction with the issuer 106 may include performing identification and verification (hereinafter, "ID&V") of the user 102 to ensure that the user 102 is authorized to register the device 104. If the user 102 is properly identified and verified, the issuer 106 may instruct a tokenization service 108 to generate a token associating the device 104 with the payment account of the user 102. The tokenization service 108 may be, for example, the MDES service offered by the assignee of the present application or a similar service that provides tokenization services to issuers and their users. The issuer 106 may be implemented as several services acting on behalf of an issuer. For example, the issuer 106 may consist of one or more hosts as well as one or more access control systems ("ACS") which operate together to provide the functions described herein.

The tokenization service 108 provides the token to the device 104 (at "3") either directly or through the communication between the issuer 106 and the user 102. The tokenization service 108 stores information associating the token with an identifier of the payment account (such as the primary account number or "PAN" of a credit or debit card account). As depicted in FIG. 1, the device 104 has been assigned a device token of "xx1235D1". In a database associated with the tokenization service 108 the device token of "xx1235D1" is associated with a PAN of "xx1235" and the device 104 is the first device associated with that PAN. Those skilled in the art will appreciate that a payment card PAN is typically 15 or 16 digits in length and the example shown (where the PAN is represented as "xx1235") is simply for convenience and ease of exposition. As will be described further herein, PANs may be associated with multiple devices. Further, although not shown in FIG. 1, each device token may further be associated with a specific device identifier (e.g., such as a wallet identifier or a payment application identifier). This device identifier allows the tokenization service 108 (or the issuer 106 or other participant in a transaction) to communicate with the device identified by the identifier.

Some or all of the devices (including device 104, issuer 106, tokenization service 108 or the like) of the system 100 (as well as other devices described elsewhere herein) might be, for example, associated with a Personal Computer ("PC"), laptop computer, smartphone, an enterprise server, a server farm, and/or a database or similar storage devices. As discussed above, the device 104 may likely be a portable device such as a smart watch, an exercise monitor, or other mobile device. The device 104 may also be a device incorporated into an automobile, appliance or other system. As used herein, devices, including those associated with the system 100 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks. Note that the system 100 of FIG. 1 is provided only as an example, and embodiments may be associated with additional elements or components.

Figure 2:
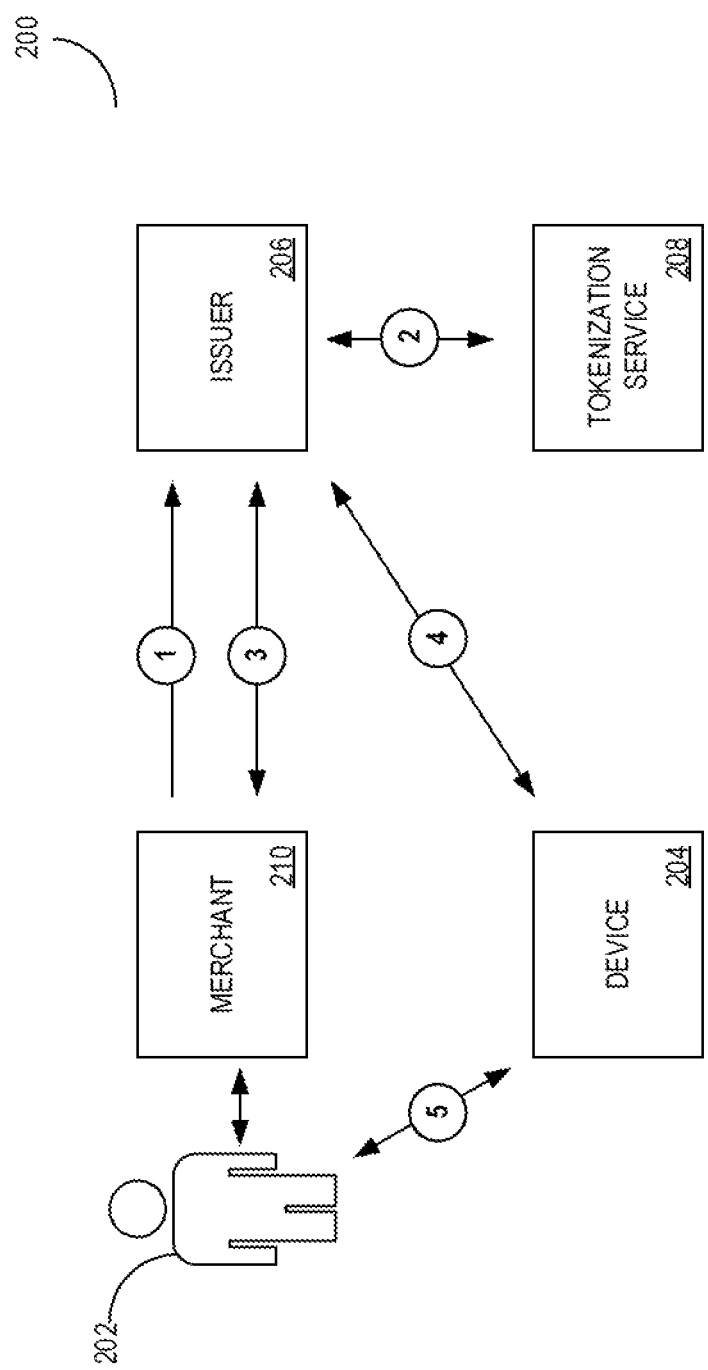
FIG. 2 is a block diagram of a system pursuant to some embodiments.

FIG. 1 provided a description of how a device 104 may be provisioned with an identified and verified "token" so that the device may be used as an authentication device (or an "authentication wallet") in transactions using the present invention. Although only a single user 102 and device 104 were described in FIG. 1, those skilled in the art, upon reading the present disclosure, will appreciate that in practice, a large number of different devices 104 may be used as authentication devices for a large number of users 102. Further, a number of issuers 106 and tokenization services 108 may be provided. Reference is now made to FIG. 2 which illustrates a system 200 that might be utilized to perform an authentication during a payment transaction using a device 204 that acts as an authentication wallet (e.g., where a device 204 has been provisioned with an identified and verified token pursuant to the process described in conjunction with FIG. 1).

FIG. 2 depicts a number of participants in a payment transaction involving a user 202 and a merchant 210. In general, the transaction described in FIG. 2 is one using a traditional four-party payment system (e.g., of the type commonly used with credit and debit card payments). Those skilled in the art, upon reading the present disclosure, will appreciate that features of the present invention may be used in conjunction with other payment schemes or systems to authenticate participants. As shown in FIG. 2, the user 202 interacts with a merchant 210 remotely (e.g., to purchase a good or service from a merchant website or application). The user 202 may be prompted to provide information to conduct the payment transaction including a PAN associated with a payment card the user 202 wishes to use to complete the transaction.

The merchant 210 typically has a contract with a financial institution (the "acquirer") to accept payments using payment cards in a payment network or system. The acquirer (not shown in FIG. 2) is in communication with the merchant 210 as well as the issuer of the payment account associated with the PAN (the issuer 206) via a payment network (not shown in FIG. 2). The merchant 210 (in conjunction with the acquirer) generates and transmits an authorization request to the issuer 206 for authorization of the transaction. The issuer 206, upon receipt of the authorization request, may determine that an additional level of authentication is required for the transaction. If so, the issuer 206 requests information identifying any available authentication devices associated with the PAN from tokenization service 206 (via interaction path "2"). The tokenization service 206 consults one or more databases to determine if the PAN is associated with any authentication devices, and, if so, returns a list of the token(s) associated with the PAN. The list of token(s) is used to retrieve (or includes) the device identifiers associated with the token(s). The list is returned to the merchant 210 (via path "3") and are presented to the user 202 so the user can select which authentication device the user wishes to use to authenticate the transaction. For example, the list may be presented to the user in an HTML snippet or iframe in a transaction screen on the merchant website. The user's selection of which authentication device to use is returned to the issuer 206 at "3".

Ideally, the user 202 selects an authentication device 204 which is currently in the user's possession. The issuer 206, at "4" presents a challenge request to the user 202 through the selected authentication device 204. The user 202 interacts with the selected authentication device 204 (at "5") to complete the challenge request. If the challenge request is completed correctly, the issuer 206 authorizes the payment transaction (assuming all other authorization parameters are satisfied) and an authorization response is transmitted to the merchant 210 to finalize the transaction. The result is a authentication approach which allows a user to employ one or more authentication devices or wallets that have previously been ID&V'd to conveniently authenticate themselves in transactions.

Figure 3:
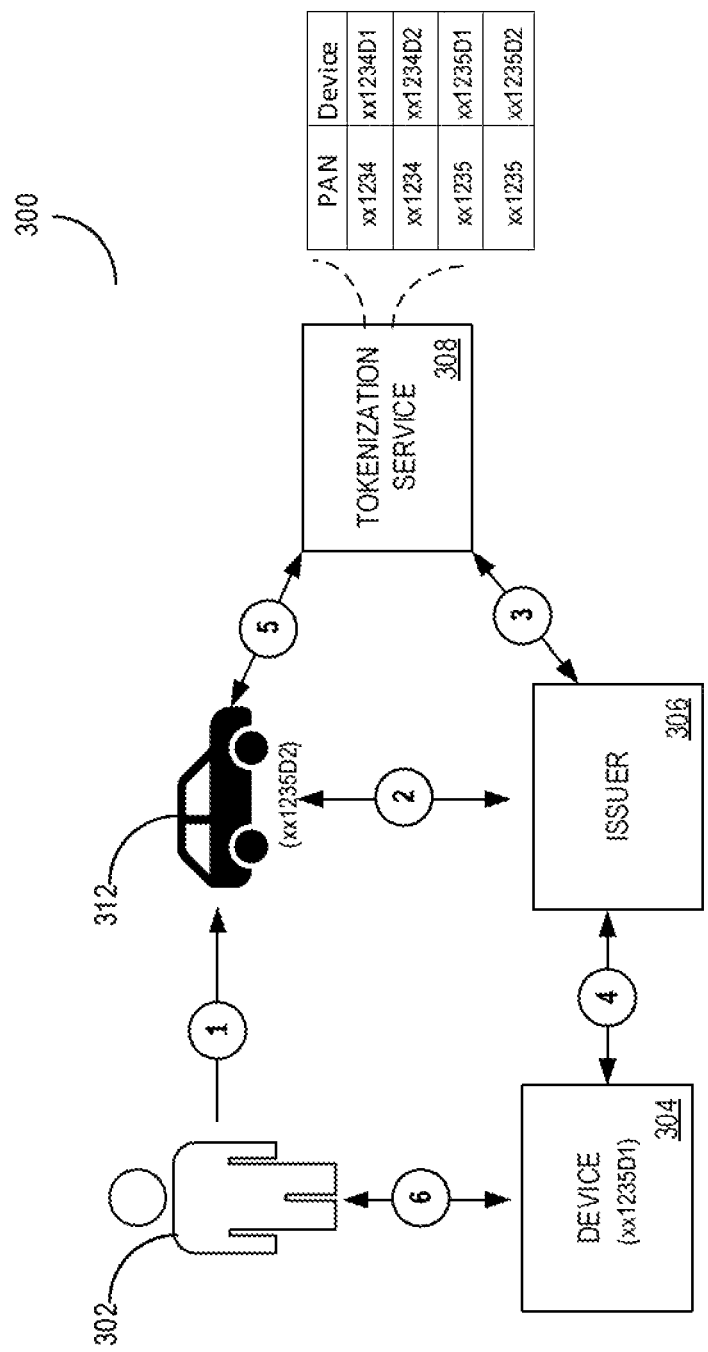
FIG. 3 is a block diagram of a system pursuant to some embodiments.

Embodiments may be used to easily create new authentication devices using an expedited ID&V process for new devices. Reference is now made to FIG. 3 which illustrates a system 300 that might be utilized to perform an expedited ID&V process to create a new authentication device 312 for a user 302 who already has an existing authentication device 304. In particular, the user 302 has already performed ID&V processing to create a device token ("xx1235D1") for a first device 304 (e.g., using the registration process of FIG. 1), and now wishes to perform ID&V processing to register a new device 312 (shown as a wallet associated with an automobile) so that the new device 312 may be used as an authentication wallet for the user's payment card identified by a PAN xx1235.

The process begins at "1" where the user 302 interacts with the new device 312 (either directly by interacting with an input and display of the device 312, or indirectly by pairing the device 312 with another device with an input and output device such as a mobile telephone, a personal computer or the like) to initiate the expedited provisioning process. For example, the user 302 may interact with a web page provided by an issuer 306 of a payment card issued to the user 302 to associate the payment card PAN with the device 304 (shown as the interaction at "2"). Processing continues at "3" where the issuer 306 queries the tokenization service 308 to request a list of any previously ID&V'd devices. As described above in conjunction with FIG. 2, the tokenization service 308 uses the PAN provided by the issuer 306 to identify any authentication devices associated with the PAN and returns a list of those devices to the issuer 306. The issuer 306 may present the list of available devices to the user for the user's selection. The issuer 306 then transmits a challenge request to the selected authentication device 304. If the user 302 correctly responds to the challenge request (at "4") using the selected authentication device 304 the issuer 306 interacts with the tokenization service 308 to request that the new device 312 be tokenized and registered with the service 308. The tokenization service 308 generates a device token for the device 312 and updates one or more databases associated with the service to include the new device token (as well as any wallet or device identifiers needed to communicate with the device 312).

The result is an efficient and expedited approach to adding authentication devices for use by a user. The newly created device token for device 312 now allows the device 312 to be used in transactions as well as to be used as an authentication device for transactions involving the PAN. Multiple PANs may be associated with each device. In this manner, users may choose to ID&V a number of devices that are convenient to the user, ensuring that the user can complete transactions no matter where the user is located.

Figure 4:
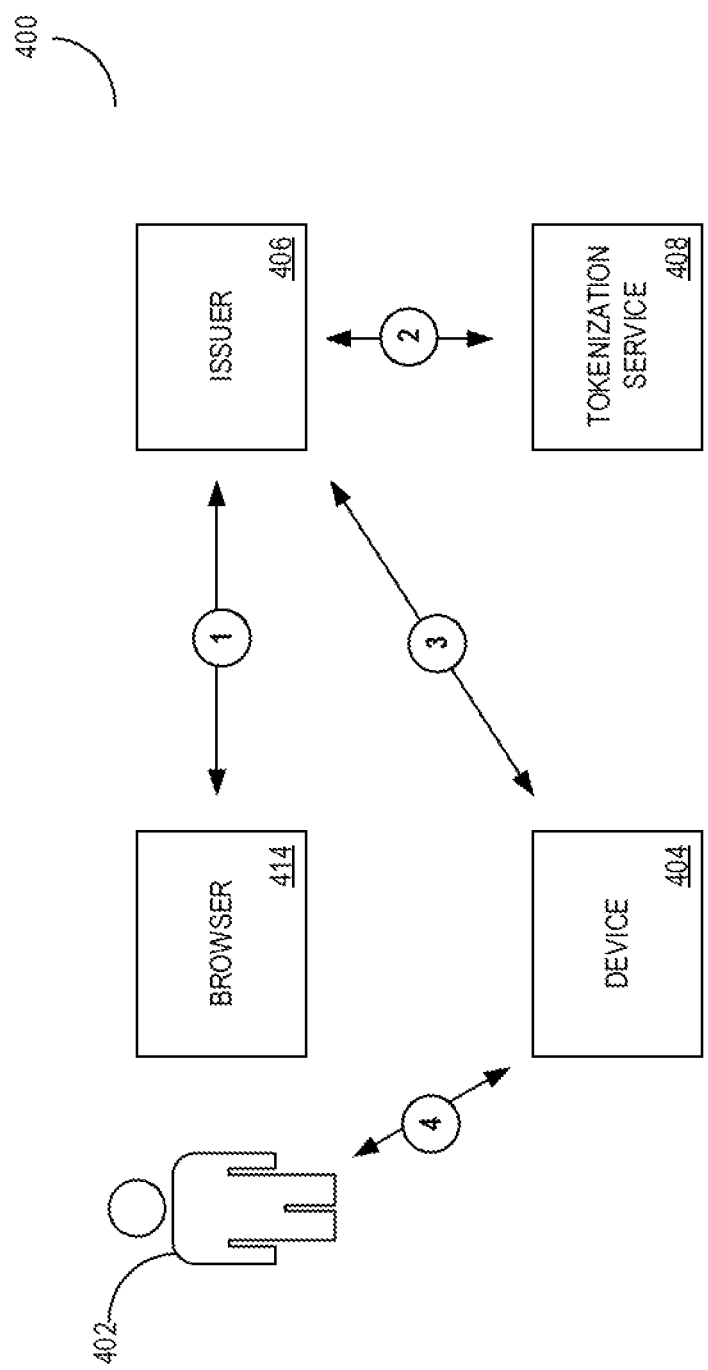
FIG. 4 is a block diagram of a system pursuant to some embodiments.

While some embodiments have been described as being used in conjunction with payment transactions, embodiments are not limited to such transactions. Reference is now made to FIG. 4 where a system 400 is shown for conducting a non-payment transaction involving a user 402 and a financial institution (shown as issuer 406). For example, the user 402 may wish to logon to an electronic banking application of the issuer 406 via an unauthenticated browser 414 (at "1"). The issuer 406 determines that the browser or device is not authenticated, and initiates step up authentication processing for the user 402 and provides information associated with the user (such as, for example, a PAN or other information) to a tokenization service 408 (at "2"). The tokenization service 408 identifies any authentication device(s) associated with the user 402 and provides the list to the issuer 406. The issuer 406 provides the list to the user (e.g. via the browser 414) for the user to select a desired authentication device 404 to authenticate themselves with. Upon receipt of the selection, the issuer 405 generates and transmits a challenge request to the device 404 (at "3") and the user 402 interacts with the device 404 (at "4") to respond to the challenge request. If the challenge request is successful, the issuer 406 may permit the user 402 to access the service (e.g., the electronic banking application). In this manner, embodiments allow service providers to perform authentication processing using the present invention.

Figure 5:
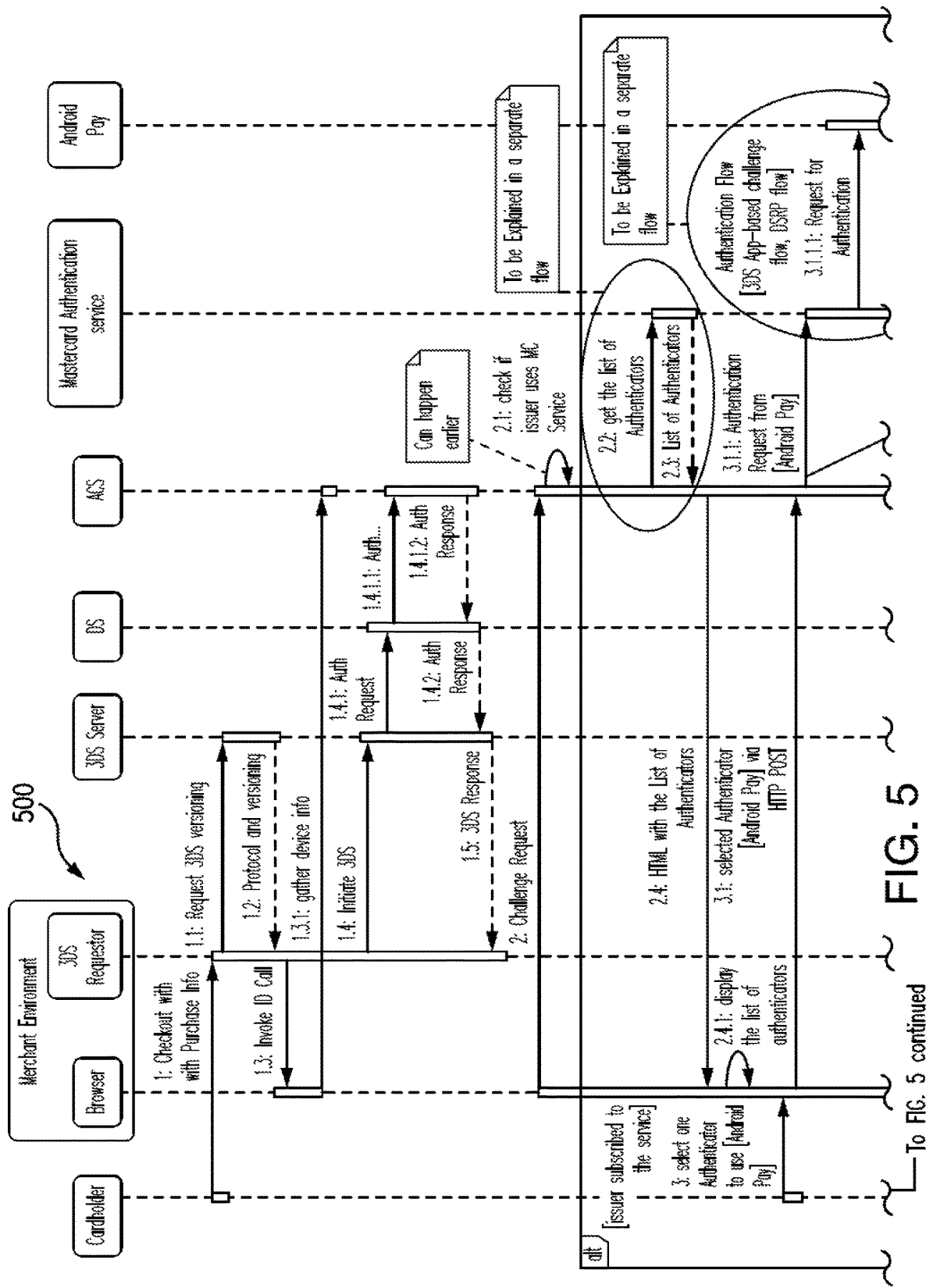
FIG. 5 is a process diagram depicting a process pursuant to some embodiments.
Figure 5:
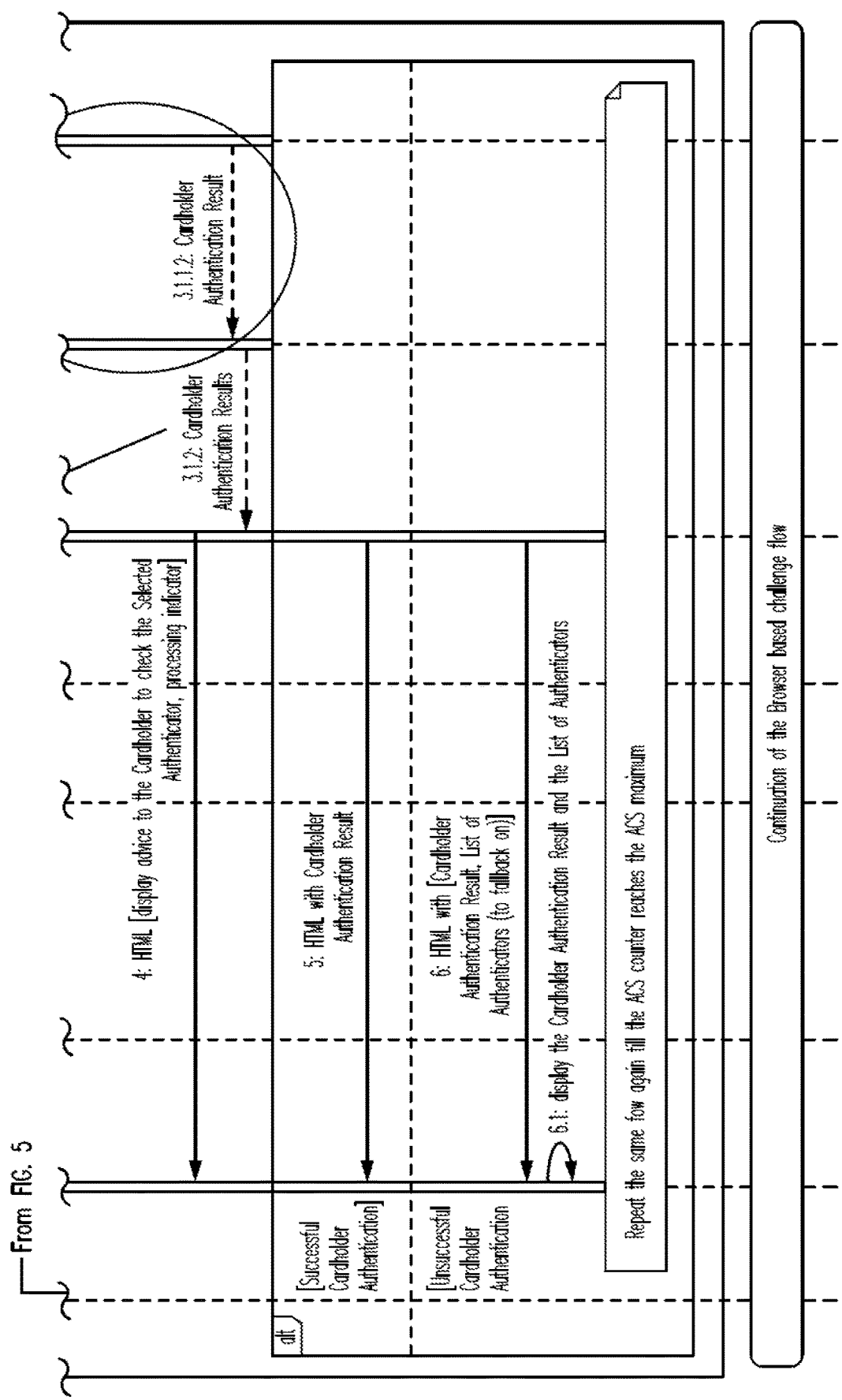

Embodiments may be used in conjunction with existing payment transaction flows to provide an additional level of authentication in certain transactions. For example, embodiments may be used in conjunction with so-called 3D Secure transactions (e.g., such as the MasterCard SecureCode transactions). Reference is now made to FIG. 5 where a transaction flow 500 in such a scenario is shown. Transaction flow 500 involves a number of different entities, shown along the top row of FIG. 5, including a cardholder, a merchant operating a merchant environment which consists of a browser component as well as a 3DS Requestor component in communication with a 3DS Server, a directory server ("DS") and an access control server ("ACS"). The browser component is also in communication with the ACS, an Authentication Service (operated by one or more entities to provide the authentication services described herein) and a wallet application (shown as "Android Pay"). The details of some portions of the transaction flow 500 will not be described in detail herein as they generally relate to 3DS transactions, however, certain transaction steps that relate to the present invention will be described by referring to the message number and name.

Figure 6A:
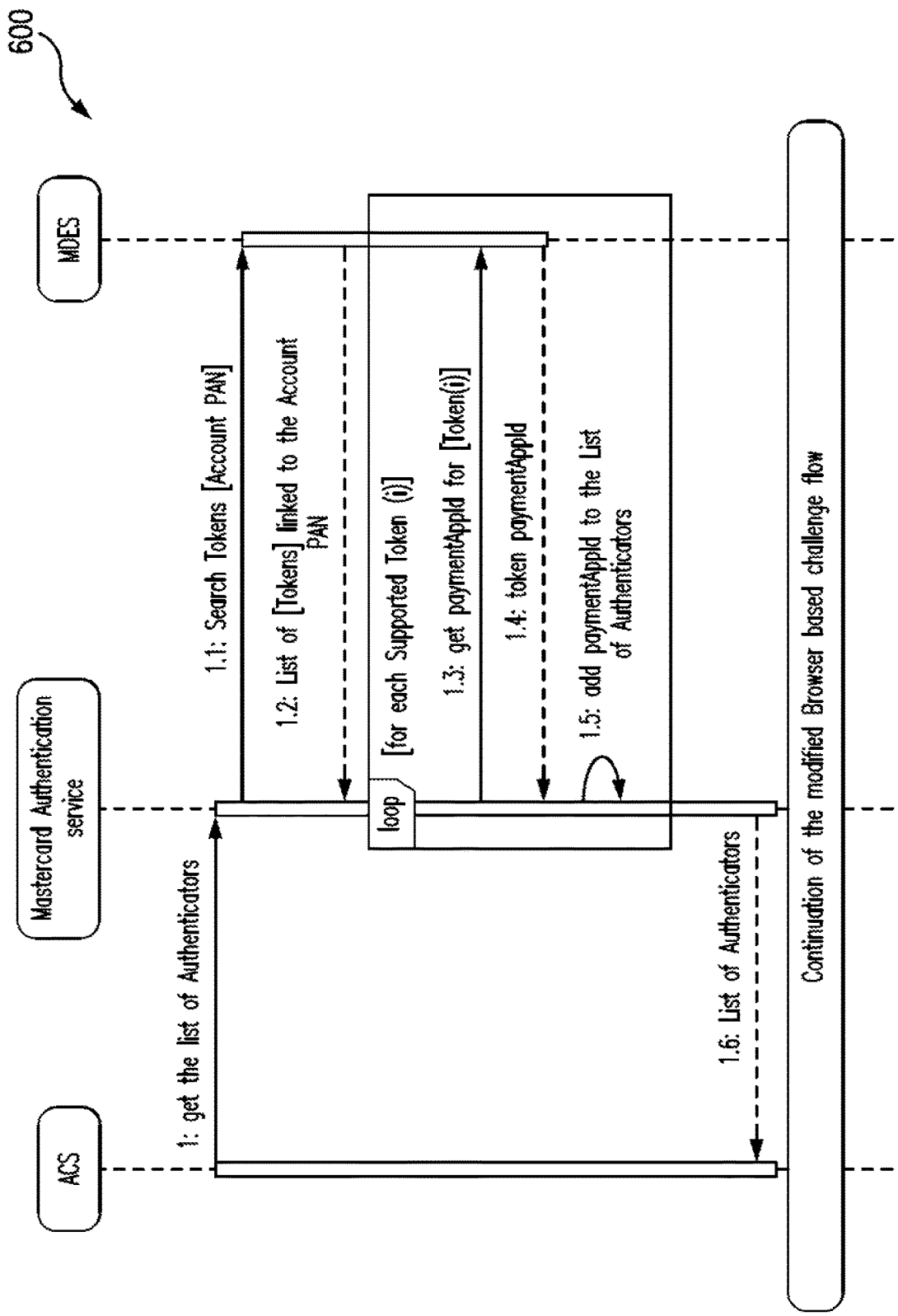
FIGS. 6A and 6B are process diagrams depicting processes pursuant to some embodiments.
Figure 6B:
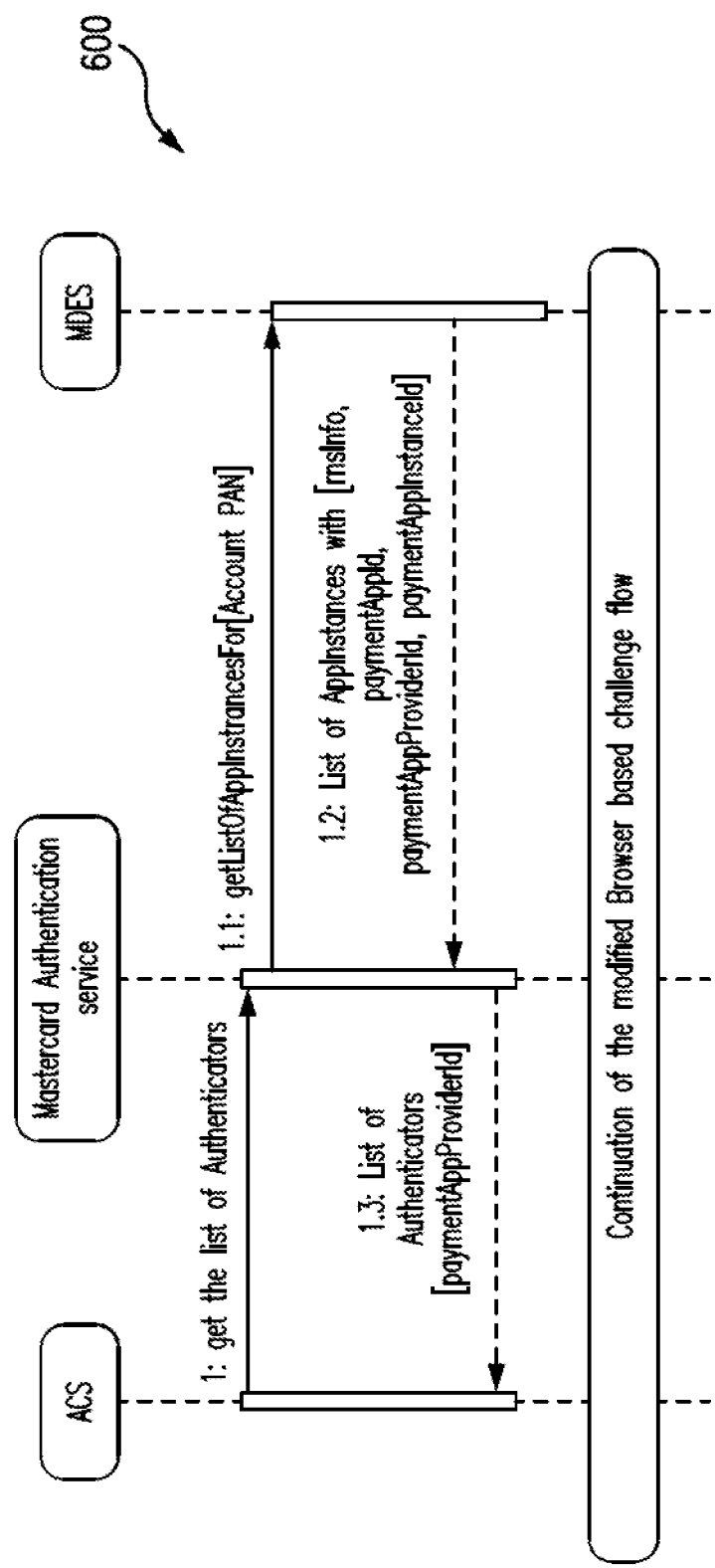

In general, in the flow of FIG. 5 (as well as FIGS. 6A and 6B that follow), several entities are shown (including the ACS and DS) which may operate on behalf of issuers. For example, in some of the flows described above (e.g., such as in conjunction with FIG. 2, for example) an issuer 206 is shown as making requests to a tokenization service 208. In the flows of FIGS. 5, 6A and 6B, the entities shown as the DS or ACS may be acting on behalf of an issuer and make the requests to an authentication service to obtain the applicable tokens that may be used (as well as information about other authenticators, such as, for example, the FIDO authenticator described in conjunction with FIG. 10).

In the transaction flow 500, after the cardholder has interacted with the merchant to initiate a checkout with purchase information, and after a 3DS process has occurred, a "2: challenge request" may be issued which causes the ACS to determine whether the issuer of the payment card used by the cardholder uses the Authentication Service. If so, the ACS interacts with the Authentication Service to obtain a list of authenticators associated with the PAN of the payment card being used in the transaction (using messages 2.2 and 2.3). The ACS then returns the list of authenticators with HTML to the browser (at message 2.4). The cardholder selects an authenticator (in this example, the cardholder has an Android wallet registered as an authenticator device and selects that device). The identification of the selected authenticator is transmitted to the ACS at message 3.1, and the ACS causes an authentication request to be transmitted to the selected device at 3.1.1 (and further causing an authentication flow to occur which will be described further in FIG. 6). The result of the authentication is returned to the ACS in message 3.1.2. If the authentication was successful, HTML with the successful result is presented in the browser at message 5. If the authentication was unsuccessful, a different response is presented to the browser at message 6 and 6.1 (e.g., prompting the cardholder with a list of other authenticator devices to use). In this way, embodiments allow remote transactions to be "stepped-up" to a higher level of authentication in certain situations and allow cardholders to conveniently choose which authenticator device to use to perform the authentication.

Reference is now made to FIGS. 6A and 6B which show further details of how the Authentication Service may interact with a tokenization service (shown as the "MDES" service offered by the assignee of the present application, but which may be any service providing tokenization services). In a first embodiment (shown in FIG. 6A), when the ACS issues a request to get a list of authenticators associated with the PAN, the Authentication Service issues a first request to the tokenization service to obtain a list of tokens associated with the PAN, and then, for each returned token, queries the tokenization service to obtain device identifiers (e.g., shown as payment application identifiers) associated with the list of tokens. The resulting list is then returned to the ACS at 1.6.

In a second embodiment (shown in FIG. 6B), a single query is issued to the Authentication Service and then to the tokenization service and the tokenization service returns a list of authenticators with the device identifiers (again shown as payment application identifiers) as well as other information associated with the devices (or wallets). In either embodiment, the ACS is provided with sufficient information to perform the authentication processing as shown in FIG. 5.

Figure 7:
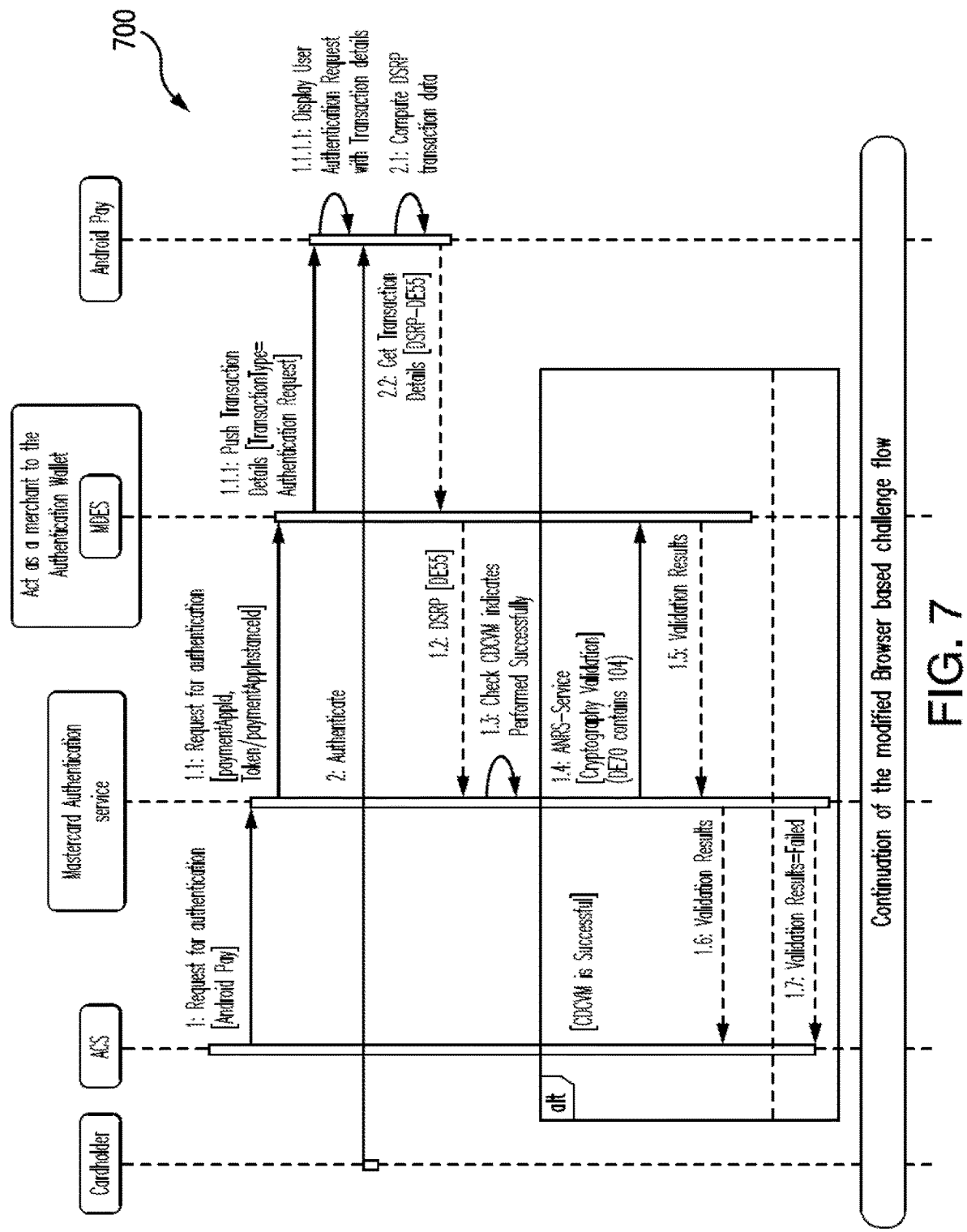
FIG. 7 is a process diagram depicting a process pursuant to some embodiments.
Figure 8:
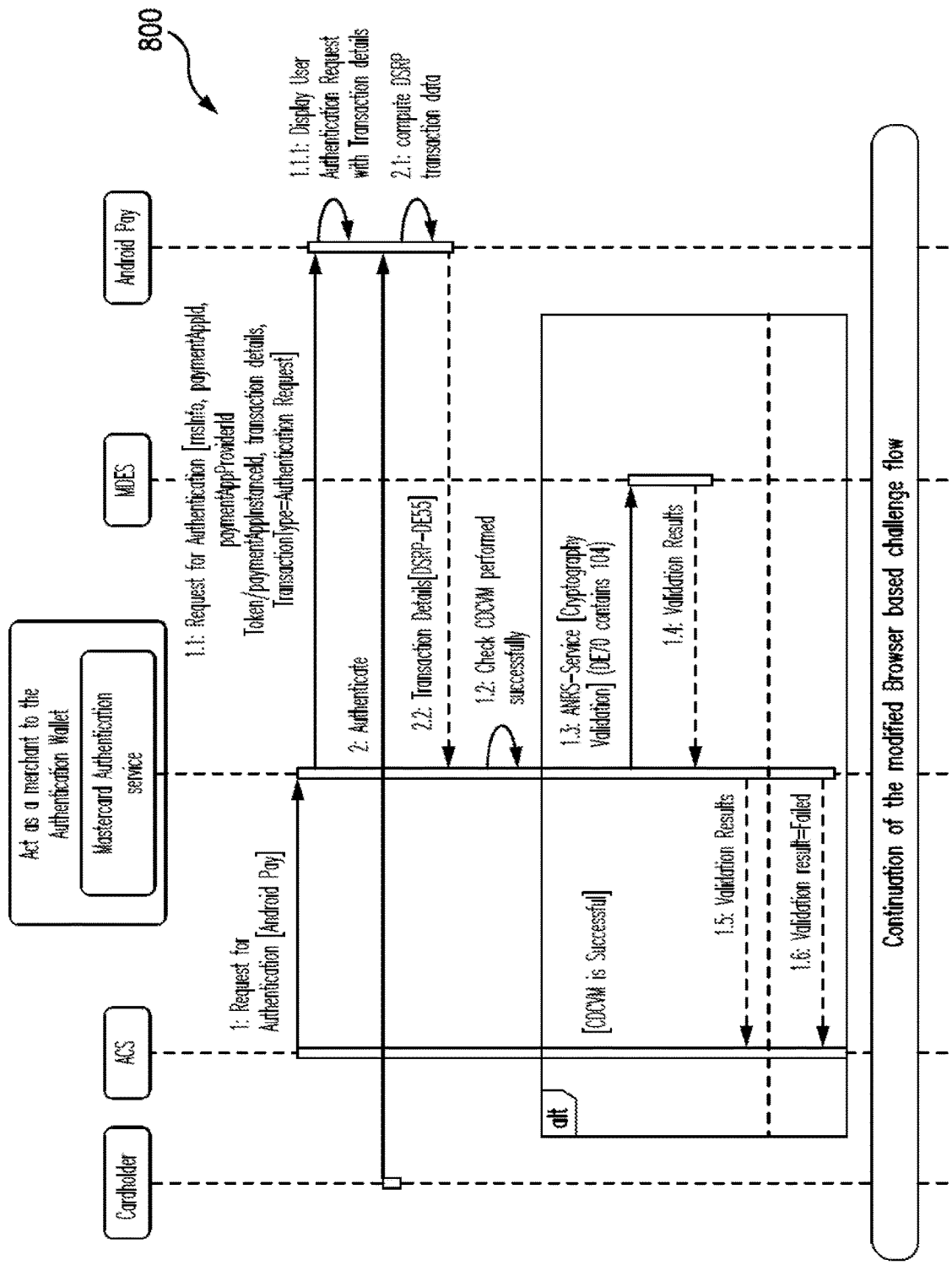
FIG. 8 is a process diagram depicting a process pursuant to some embodiments.

Reference is now made to FIGS. 7 and 8 which show several embodiments of the authentication request and response that may occur in the process of FIG. 5 after the ACS has received a list of authenticators and the cardholder has selected an authenticator for use. For example, in the embodiment shown in FIG. 7 the ACS initiates a request for authentication with the selected authenticator (again, in the example, the cardholder selected an Android wallet for use as the authenticator). The Authentication Service and the tokenization service cause the authentication request to be transmitted to the selected authenticator. In the example shown in FIG. 7, the challenge to be completed by the cardholder and the selected authenticator is one pursuant to the Digital Secure Remote Payments ("DSRP") specification used by the assignee of the present application (although those skilled in the art, upon reading the present disclosure, will appreciate that other challenge approaches may be used with desirable results). In this transaction flow, the tokenization service provider acts as the merchant to the authentication device.

In the transaction flow shown in FIG. 8, the Authentication Service acts as the merchant to the authentication device (and again uses as an illustrative example the DSRP approach for the challenge). In the flow of FIG. 8, the ACS initiates a request for authentication, and the Authentication Service has the required information (obtained as a result of processing of FIG. 6B) to cause the authentication request to be transmitted to the selected authentication device (again, the illustrative example is the cardholder selected to use an Android wallet as the authenticator). The result is a system that allows a variety of different authentication processes to be used with authentication devices that have been registered using embodiments of the present invention.

The flow charts and transaction flows described herein do not imply a fixed order to the steps, and embodiments of the present invention may be practiced in any order that is practicable. Although some figures use numbers to indicate a sequence of steps, those steps are illustrative and may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The embodiments described herein may be implemented using any number of different hardware configurations. Embodiments described herein may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 9:
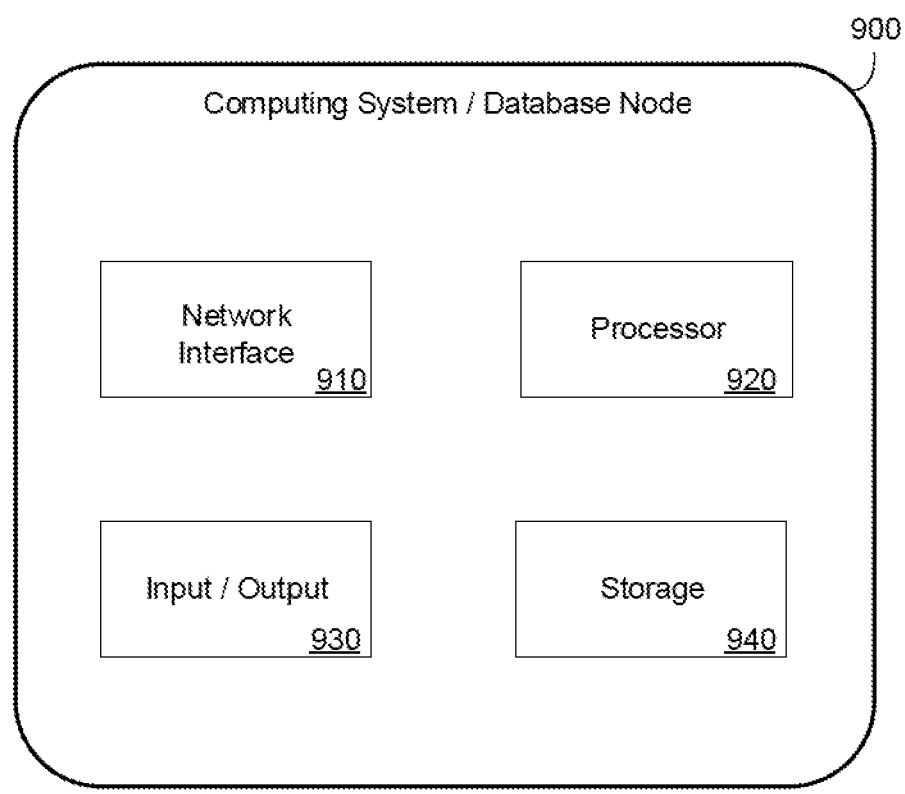
FIG. 9 is a block diagram of an apparatus in accordance with some embodiments of the present invention.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 9 illustrates an example computing system 900 which may represent or be integrated in any of the above-described components (such as, for example, the tokenization service 108 or the device 104, etc.). FIG. 9 is not intended to suggest any limitation as to the scope of use or functionality of embodiments described herein. The computing system 900 is capable of being implemented and/or performing any of the functionality set forth hereinabove.

The computing system 900 may include a computer system/server, which is operational with numerous other general-purpose or special purpose computing system environments or configurations. Examples of well-known computing systems, environments, and/or configurations that may be suitable for use as computing system 900 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like.

The computing system 900 may be described in the general context of computer system-executable instructions, such as program modules, being executed by a computer system. Generally, program modules may include routines, programs, objects, components, logic, data structures, and so on that perform particular tasks or implement particular abstract data types. The computing system 900 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 9, the computing system 900 is shown in the form of a general-purpose computing device. The components of computing system 900 may include, but are not limited to, a network interface 910, one or more processors or processing units 920, an output 930 which may include a port, an interface, etc., or other hardware, for outputting a data signal to another device such as a display, a printer, etc., and a storage device 940 which may include a system memory, or the like. Although not shown, the computing system 900 may also include a system bus that couples various system components including system memory to the processor 920.

The storage device 940 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 940 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 940 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 900 may also communicate with one or more external devices such as a keyboard, a pointing device, a display, etc.; one or more devices that enable a user to interact with computer system/server; and/or any devices (e.g., network card, modem, etc.) that enable computing system 900 to communicate with one or more other computing devices. Such communication can occur via I/O interfaces. Further, computing system 900 can communicate with one or more networks such as a local area network (LAN), a general wide area network (WAN), and/or a public network (e.g., the Internet) via network interface 910. As depicted, network interface 910 may also include a network adapter that communicates with the other components of computing system 900 via a bus. Although not shown, other hardware and/or software components could be used in conjunction with the computing system 900. Examples include, but are not limited to: microcode, device drivers, redundant processing units, external disk drive arrays, RAID systems, tape drives, and data archival storage systems, etc.

Pursuant to some embodiments, the computing system 900 may be a user device (e.g., such as a mobile phone, tablet computer, personal computer or the like) operated by a user to display from a merchant website during a purchase transaction involving the secure remote commerce system of the present invention.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

A number of different authentication techniques may be used in conjunction with the present invention. For example, as discussed above, DSRP challenges may be used with desirable results. In other embodiments, which will be described by reference to FIG. 10, FIDO authentication techniques may be used for authentication. In particular, pursuant to some embodiments, FIDO techniques may be used to provide enhanced authentication techniques (e.g., including biometric and other techniques). FIDO protocols use standard public key cryptography techniques to provide stronger authentication and are published by the FIDO Alliance at https://fidoalliance.org. In general, an authentication flow using an authentication device that uses FIDO techniques in a system of the present invention follows the same flow as the other flows described herein with the exception that the authentication device communicates with a FIDO Server. Further, in some embodiments, a user device 1004 may be equipped to support different authentication approaches. For example, the user device 1004 may have a first wallet (that uses FIDO authentication techniques) and a second wallet (such as an application issued by the issuer of a payment account) that uses different authentication techniques. The determination of which authentication technique to use may be made based on, for example, rules associated with the issuer or the type of transaction.

Figure 10:
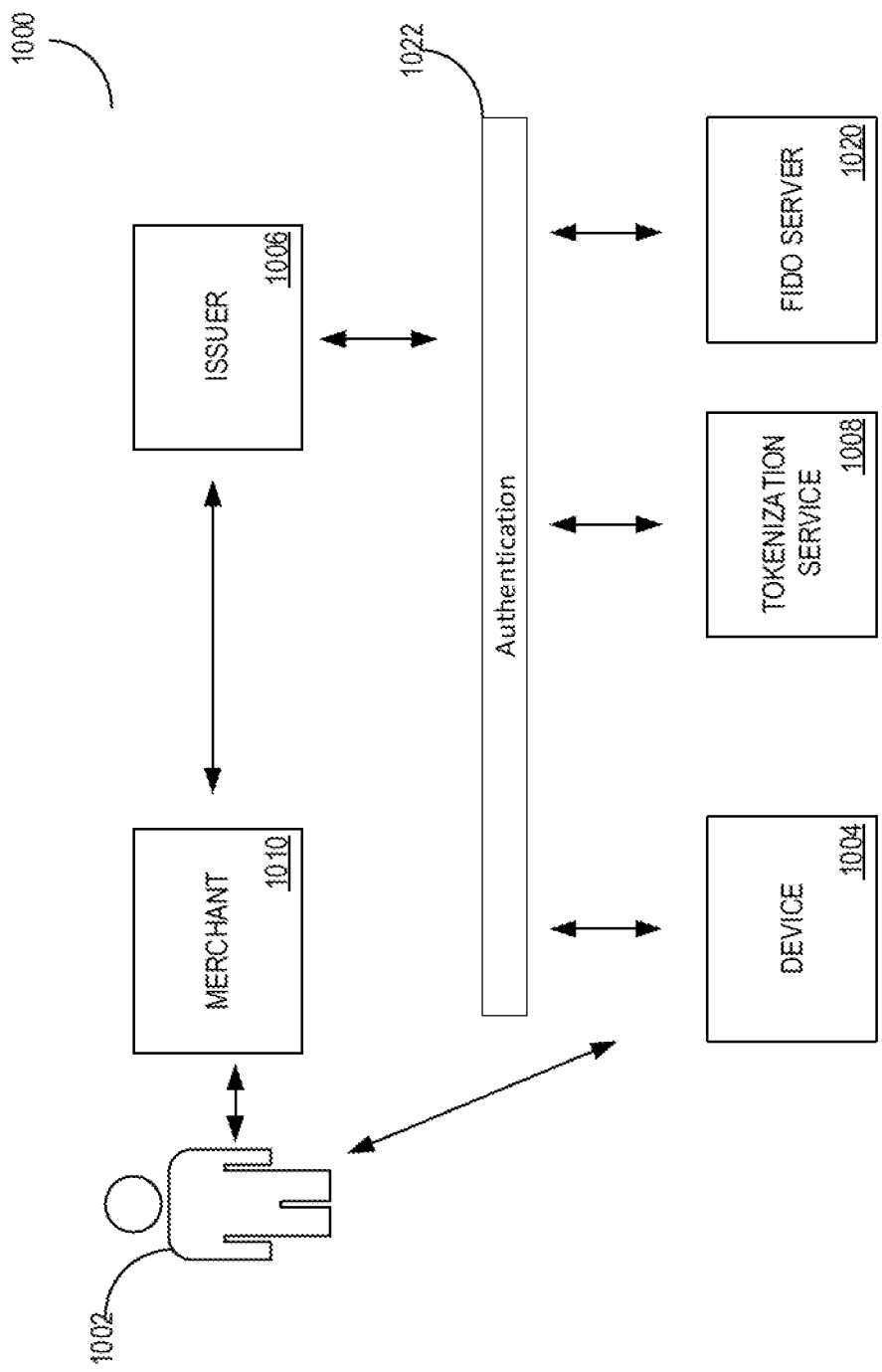
FIG. 10 is a block diagram of a system pursuant to some embodiments.

FIG. 10 depicts a system that may be used to conduct a payment transaction between a user 1002 and a merchant 1010 and is generally similar to the transaction shown in FIG. 2 above. However, in the embodiment of FIG. 10, the device 1004 selected for use by the user 1002 for authentication is one that uses biometric authentication and is in communication with a FIDO Server 1020. In the embodiment depicted, the issuer 1006 interacts with device 1004, tokenization service 1008 and one or more FIDO servers 1020 via an authentication layer 1022 which may be, for example, an authentication management or routing service operated by an entity such as, for example, the assignee of the present application. In a transaction using the system of FIG. 10, the user interacts with a merchant 1010 as normal, and the merchant 1010 interacts with an issuer 1006 to obtain an authorization for the transaction. In the event the issuer 1006 determines that a "stepped-up" level of authentication is required for the transaction, the issuer 1006 interacts with the authentication layer 1022 which interacts with the tokenization service to identify the available registered authentication devices (that have either tokens or FIDO authenticators) associated with the PAN of the transaction. For example, the authentication layer 1022 may request a list of all potential authenticator wallets or devices associated with the user 1002 (or more particularly, associated with the PAN of the payment card selected for use in the transaction by the user 1002). The list may be obtained from the tokenization service 1008 and returned to the issuer 1006 for presentation to the user 1002 for selection.

Pursuant to some embodiments, the list may include one or more FIDO authenticators associated with the PAN. If the user selects to use authentication device 1004 (which, in this example, is FIDO compatible device or wallet), the authentication layer 1022 requests the authentication from the FIDO server 1020 to authenticate the user 1002 using the selected authenticator on the selected device 1004. The FIDO server 1020 validates the response and returns the authentication results to the authentication layer 1022 which returns the response back to the issuer 1006 (or, in some embodiments, to an ACS or DS if one or both are standing in on behalf of the issuer).

The result is a system allowing enhanced authentication techniques to be used (including, for example, authentication techniques using the FIDO protocol) during transactions which require an enhanced authentication. In other embodiments, other authentication services may be utilized with similar desirable results. For example, embodiments may utilize biometric or other authentication techniques following NuDetect approaches as described at www.nudatasecurity.com. Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of enterprise applications, embodiments may instead be associated with other types of applications in additional to and/or instead of the ones described herein (e.g., financial applications, medical applications, manufacturing applications, etc.). Similarly, although certain attributes were described in connection some embodiments herein, other types of attributes might be used instead.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A method for operating an authentication service to authenticate a user in a transaction involving the user and a merchant, the method comprising:
   receiving, by the authentication service, an authorization request, the authorization request including information identifying the merchant, information identifying the transaction and information identifying a selected payment device;
   determining that an issuer of the payment device is a registered participant of the authentication service;
   identifying, based on the information identifying the selected payment device, a list of registered authentication devices associated with the user;
   generating, a list of registered authentication devices for display to the user;
   receiving a selection of a registered authentication device from the user;
   identifying, for each registered authentication device, a payment token;
   identifying, for each payment token, a payment application identifier;
   transmitting a request for authentication from the user using the selected registered authentication device; wherein transmitting the request for authentication from the user using the selected registered authentication device further includes transmitting the information identifying the transaction to the payment application identified by the payment application identifier of the selected registered authentication device;
   receiving an authentication response from the selected registered authentication device; and
   causing the information identifying the transaction to be displayed to the user on the selected registered authentication device.

2. The method of claim 1,
   wherein transmitting the request for authentication from the user using the selected registered authentication device is performed using a push notification.

3. The method of claim 1, wherein the transaction involving the user and the merchant is initiated by the user operating a first user device and wherein the list of registered authentication devices for display to the user is for display on the first user device.

4. The method of claim 3, wherein the first user device is different than the selected registered authentication device.

5. The method of claim 3, further comprising:
   determining that the request for authentication from the user using the selected registered authentication device has failed;
   generating an updated html list of registered authentication device for display to the user on the first user device;
   receiving a selection of a second registered authentication device from the user; and
   initiating an updated request for authentication from the user using the second registered authentication device.

6. The method of claim 1, wherein each registered authentication device in the list of registered authentication devices has been authenticated by the user using a verified device of the user.

7. The method of claim 6, wherein each registered authentication device in the list of registered authentication devices stores a token issued by a tokenization service, wherein the token is associated with the payment device of the user and the registered authentication device.

8. An authentication system, comprising:
   a memory storing data associated with payment accounts; and
   a processor configured to
      receive an authorization request, the authorization request including information identifying a merchant, information identifying a transaction and information identifying a payment device selected by a user;
      determine that an issuer of the payment device is a registered participant in a service provided by the authentication system;
      identify, based on the information identifying the selected payment device, a list of registered authentication devices associated with the user;
      generate, a list of registered authentication devices for display to the user;
      receive a selection of a registered authentication device from the user;
      identify, for each registered authentication device, a payment token;
      identify, for each payment token, a payment application identifier;
      transmit a request for authentication from the user using the selected registered authentication device; wherein transmitting the request further includes transmitting the information identifying the transaction to the payment application identified by the payment application identifier of the selected registered authentication device;
      receive an authentication response from the selected registered authentication device; and
      cause the information identifying the transaction to be displayed to the user on the selected registered authentication device.

9. The system of claim 8,
   wherein the transmission of the request for authentication from the user using the selected registered authentication device is performed using a push notification.

10. The system of claim 8, wherein the transaction involving the user and the merchant is initiated by the user operating a first user device and wherein the list of registered authentication devices for display to the user is for display on the first user device.

11. The system of claim 10, wherein the first user device is different than the selected registered authentication device.

12. The system of claim 10, wherein the processor is further configured to:
  determine that the request for authentication from the user using the selected registered authentication device has failed;
  generate an updated list of registered authentication device for display to the user on the first user device;
  receive a selection of a second registered authentication device from the user; and
  transmit an updated request for authentication from the user using the second registered authentication device.

13. A non-transitory, computer-readable medium storing instructions that, when executed by a processor, cause the processor to:
  receive an authorization request, the authorization request including information identifying a merchant, information identifying a transaction and information identifying a payment device selected by a user;
  determine that an issuer of the payment device is a registered participant in a service provided by the authentication system;
  identify, based on the information identifying the selected payment device, a list of registered authentication devices associated with the user;
  generate, a list of registered authentication devices for display to the user;
  receive a selection of a registered authentication device from the user;
  identify, for each registered authentication device, a payment token;
  identify, for each payment token, a payment application identifier;
  transmit a request for authentication from the user using the selected registered authentication device; wherein transmitting the request further includes transmitting the information identifying the transaction to the payment application identified by the payment application identifier of the selected registered authentication device;
  receive an authentication response from the selected registered authentication device; and
  cause the information identifying the transaction to be displayed to the user on the selected registered authentication device.

14. The medium of claim 13 wherein the transaction involving the user and the merchant is initiated by the user operating a first user device and wherein the list of registered authentication devices for display to the user is for display on the first user device.

15. The medium of claim 14 further comprising instructions that, when executed by the processor, cause the processor to:
  determine that the request for authentication from the user using the selected registered authentication device has failed;
  generate an updated list of registered authentication device for display to the user on the first user device;
  receive a selection of a second registered authentication device from the user; and
  transmit an updated request for authentication from the user using the second registered authentication device.

* * * * *